US012410718B2

(12) United States Patent
Masson et al.

(10) Patent No.: US 12,410,718 B2
(45) Date of Patent: Sep. 9, 2025

(54) METHOD FOR PREPARING A ROOT OF A TURBOMACHINE BLADE

(71) Applicant: SAFRAN AIRCRAFT ENGINES, Paris (FR)

(72) Inventors: Antoine Hubert Marie Jean Masson, Moissy Cramayel (FR); Geneviève Mougey, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/694,821

(22) PCT Filed: Aug. 26, 2022

(86) PCT No.: PCT/FR2022/051613
§ 371 (c)(1),
(2) Date: Mar. 22, 2024

(87) PCT Pub. No.: WO2023/047030
PCT Pub. Date: Mar. 30, 2023

(65) Prior Publication Data

US 2024/0287910 A1 Aug. 29, 2024

(30) Foreign Application Priority Data

Sep. 24, 2021 (FR) ...................................... 2110098

(51) Int. Cl.
*F01D 5/28* (2006.01)
*F01D 5/00* (2006.01)
*F01D 5/30* (2006.01)

(52) U.S. Cl.
CPC ............. *F01D 5/282* (2013.01); *F01D 5/005* (2013.01); *F01D 5/30* (2013.01); *F05D 2230/80* (2013.01); *F05D 2300/603* (2013.01)

(58) Field of Classification Search
CPC . F01D 5/30; F01D 5/282; F01D 5/005; F05D 2230/80
See application file for complete search history.

(56) References Cited

U.S. PATENT DOCUMENTS

2007/0048142 A1* 3/2007 Dambrine ............. F01D 5/3092 416/219 R
2013/0302173 A1 11/2013 Booze et al.

FOREIGN PATENT DOCUMENTS

EP 1 085 172 A2 3/2001
FR 2 890 126 A1 3/2007

(Continued)

OTHER PUBLICATIONS

Le Cloarec, FR 3049305 A1 English translation, 2017 (Year: 2017).*

(Continued)

*Primary Examiner* — Michael L Sehn
(74) *Attorney, Agent, or Firm* — Pillsbury Winthrop Shaw Pittman LLP

(57) ABSTRACT

A method for preparing a root of a blade for mounting a turbomachine blade, made of composite material, in a root support, the method including positioning, on a side wall of the root of the blade, an anti-wear layer including synthetic fibres coated or impregnated with a bonding agent; polymerising the bonding agent such that the anti-wear layer adheres to the side wall of the root of the blade; and machining a free outer surface of the anti-wear layer intended to be in contact with the root support, so as to obtain a precision-ground outer surface.

9 Claims, 2 Drawing Sheets

(56) References Cited

FOREIGN PATENT DOCUMENTS

| | | | |
|---|---|---|---|
| FR | 2 890 684 | A1 | 3/2007 |
| FR | 3 049 305 | A1 | 9/2017 |
| FR | 3 059 323 | A1 | 6/2018 |
| WO | WO 2014/164859 | A2 | 10/2014 |
| WO | WO 2015/023345 | A1 | 2/2015 |

OTHER PUBLICATIONS

International Search Report as issued in International Patent Application No. PCT/FR2022/051613, dated Oct. 13, 2022.

* cited by examiner

[Fig. 1]
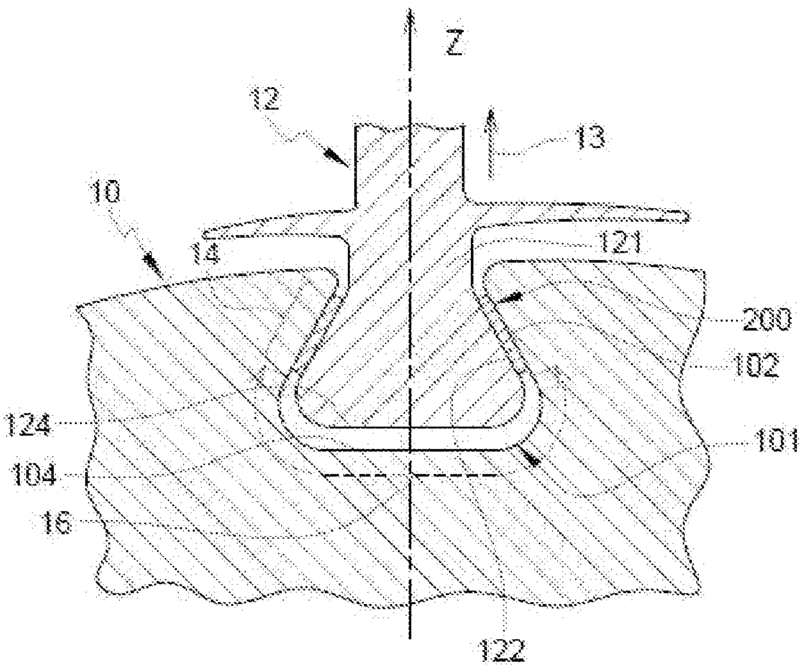
[Fig. 2]
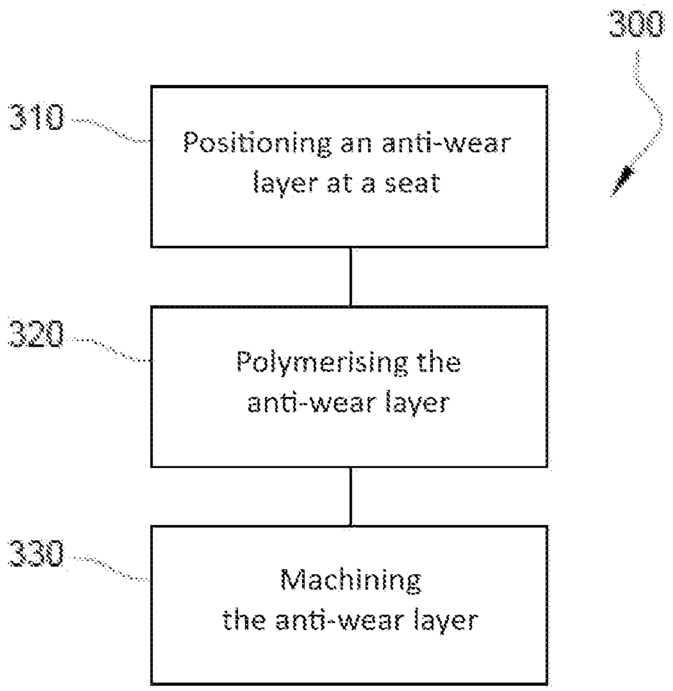

[Fig. 3]
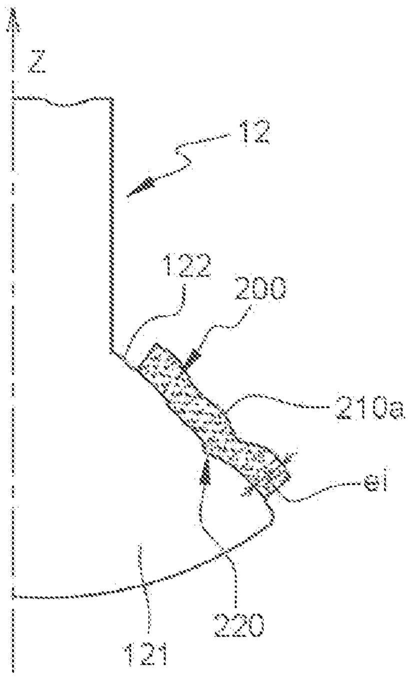
[Fig. 4]
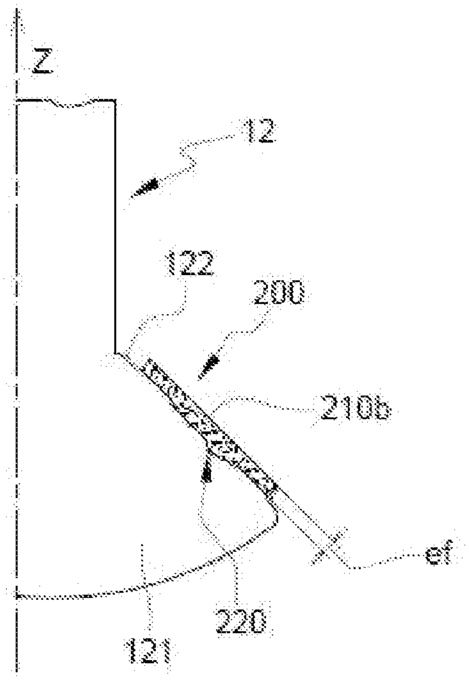

METHOD FOR PREPARING A ROOT OF A TURBOMACHINE BLADE

CROSS-REFERENCE TO RELATED APPLICATIONS

This application is the U.S. National Stage of PCT/FR2022/051613, filed Aug. 26, 2022, which in turn claims priority to French patent application number 2110098 filed Sep. 24, 2021. The content of these applications are incorporated herein by reference in their entirety.

TECHNICAL FIELD OF THE INVENTION

The technical field of the invention is that of the preparation of a turbomachine vane root for the purpose of mounting it in a root support.

The invention more particularly relates to preparing and mounting a fan vane in a fan disc of a turbomachine.

The invention also relates to a turbomachine vane obtained by such a method, as well as to a rotor assembly of a turbomachine.

TECHNICAL BACKGROUND

In the present application, the terms "upstream" and "downstream" are defined in relation to the normal direction of gas flow (from upstream to downstream) through a turbomachine.

The axis of rotation of a turbomachine rotor is also referred to as the "turbomachine axis" or "engine axis". The axial direction corresponds to the direction of the axis of the turbomachine and a radial direction is a direction perpendicular to the axis of the turbomachine and intersecting this axis. Similarly, an axial plane is a plane containing the axis of the turbomachine, and a radial plane is a plane perpendicular to that axis.

Unless otherwise specified, the adjectives "internal", "inner", "external" and "outer" are used in the present application with reference to a radial direction so that the internal part of an element is, along a radial direction, closer to the axis of the turbomachine than the external part of the same element.

Conventionally, a turbomachine includes, from upstream to downstream, i.e. in the flow direction of the gas streams, a fan, one or more compressors, a combustion chamber, one or more turbines, and a nozzle for ejecting combustion gases leaving the turbine or turbines.

In a rotor system (i.e. an assembly integral with the rotor), the (moving) vanes are attached to a rotor disc by fastening systems, which may be straight or curved pinned fasteners, hammer fasteners or fir fasteners. These fastening systems can be described as devices in which the vane roots form male parts of the system and are held radially in female parts of the system, provided at the external periphery of the disc and commonly referred to as cells.

Upon rotating the rotor, the vanes are mainly subjected to centrifugal forces as well as axial aerodynamic forces and the vane roots come to abut against the parts of the disc bordering the external opening of the cells, under the effect of the centrifugal forces. The surfaces of the vane roots and the disc, abutting against each other, are commonly referred to as "seats". These seats are subject to pressure (resulting from said forces, applied to the surface of these seats). It can be estimated that this pressure depends, to a first approximation, on the square of the speed of rotation of the rotor.

It is therefore understood that the variations in the speed of rotation of the rotor during the operating cycle of the turbomachine: from standstill to full throttle, passing through the particular intermediate speeds, induce variations in pressure at the seats previously defined. These variations in pressure, combined with the elastic deformation of pieces in contact with each other, cause relative movements between the vane root and the disc. These relative movements, called sliding or separation depending on their nature, induce wear phenomena on the vane or disc seats when they are repeated. The dynamic movements of the vanes at a given rotation speed (responses of the vanes to alternating loads of a harmonic or transient nature) can also be attributed a contribution to the wear phenomenon of said seats.

Yet these wear phenomena are detrimental to the life of the turbomachine. So-called "anti-wear" solutions, i.e. delaying the onset of wear at the contact interfaces, can be adopted, including solutions based on the introduction of a third body, called a foil, between the vane roots and the disc. This foil makes it possible, especially, to double the contact interfaces (from one vane/disc interface to two vane/foil and foil/disc interfaces) and to reduce the relative movements between the pieces in contact with each other, thereby reducing wear during operation.

One example of a known foil of the above-mentioned type is described in document FR 2890684. This foil is made entirely of metal and is a suitably folded metal sheet.

One alternative to the foil, described in document FR2890126, consists in introducing as a third body a non-metal "anti-wear" film including resistant fibres impregnated with resin at the vane/disc contact interface.

Some of the vanes are made of composite material, but their surface condition is not sufficiently flat and it is not possible (or very difficult) to machine these seats without degrading and/or altering the fibres. The coating that protects the composite from wear is expensive, its range of application often generates non-compliances (in location) and does not completely solve the problem of surface condition. This leads to extra costs (factory repairs, etc.).

These solutions are therefore not entirely satisfactory.

SUMMARY OF THE INVENTION

One purpose of the invention is to provide one alternative solution to the solutions of the state of the art, which is more effective than the solutions previously described, in terms of "anti-wear" performance, so as to provide better protection for the vane and disc seats and make it possible to guarantee satisfactory flatness.

Thus, the invention seeks to provide a method for preparing a vane root for mounting a turbomachine vane made of composite material in a root support, for example a rotor disc cell, in order to improve mechanical strength of the pieces at contact pressure, while allowing very easy and rapid implementation of this method.

To this end, one object of the invention is a method for preparing a vane root for mounting a turbomachine vane made of composite material in a root support, characterised in that it comprises:

- a first step of positioning on a side wall of the vane root an anti-wear layer including synthetic fibres coated or impregnated with an adhesive agent;
- a second step of polymerising the adhesive agent so that said anti-wear layer adheres to the side wall of the vane root;

a third step of machining a free external surface of said anti-wear layer intended to be in contact with the root support, so as to obtain a ground external surface.

Advantageously, the machining step makes it possible to decrease thickness of the anti-wear layer so as to shift from an initial thickness ($e_i$) to a final thickness ($e_f$), the initial thickness corresponding to the thickness of the anti-wear layer during the positioning step.

Advantageously, the initial thickness of the anti-wear layer (200) is greater than 1 millimetre. Thus, the anti-wear layer is sufficiently thick to be handled easily and has sufficient material to be ground so as to obtain a final thickness in the order of a few tenths of one millimetre.

Advantageously, the machining step is carried out by taking the machining reference frame of the vane root as the machining reference frame of the free external surface of said anti-wear layer.

Advantageously, the anti-wear layer includes at least one woven ply of synthetic fibres, for example glass fibres.

Advantageously, before positioning the anti-wear layer, the synthetic fibres thereof are pre-coated with a surface or bulk adhesive agent.

Preferably, the adhesive agent is a thermo-polymerisable adhesive.

Advantageously, the step of polymerising the adhesive agent is carried out by placing the assembly comprising at least the vane root and the anti-wear layer in an autoclave heated to a temperature allowing polymerisation of the adhesive agent, for a predetermined minimum period of time.

According to one alternative embodiment of the method according to the invention, the vane root can be coated with a metal foil. In this case, the anti-wear layer is positioned on a surface of the foil intended to be in contact with the root support.

Another object of invention is a method for mounting the vane root of a turbomachine in a root support including a preparation step according to the method of the invention.

Another object of invention is a method for repairing a turbomachine vane root consisting in partially or totally removing a damaged anti-wear member and preparing the vane root according to the method of the invention.

Thus, the preparation method according to the invention is both integratable into a method for mounting a turbomachine vane root as well as into a vane root seat repair method.

Another object of the invention is a turbomachine vane having an anti-wear member with a ground surface for being more effective than solutions in the state of the art in terms of "anti-wear" performance and flatness, so as to provide better protection for the vane and disc seats.

This purpose is achieved by the fact that the root of the vane includes, at a seat, at least one anti-wear layer including synthetic fibres and having a ground external surface. Thus, the surface condition, and especially the flatness, of the external surface intended to come into contact with the seat of the root support is improved and controlled.

Indeed, improving the surface condition, and especially the flatness of the seats, makes it possible to improve mechanical strength of the interfaces with respect to the aforementioned loads at the vane/disk interfaces.

Another object of the invention is a turbomachine rotor assembly including a rotor disc having cells on its external periphery and a plurality of vanes according to the invention attached through their roots in said cells.

The invention also relates to a turbomachine including a rotor assembly according to the invention.

The invention and its different applications will be better understood upon reading the following description and upon examining the accompanying figures.

BRIEF DESCRIPTION OF THE FIGURES

The figures are only set forth by way of indicating and in no way limiting purposes of the invention.

FIG. 1 represents a partial transverse cross-section view of a fan vane showing mounting of the vane root in a cell of a rotor disc, the vane being subjected to centrifugal forces.

FIG. 2 is a block diagram illustrating the main steps of the method for preparing the vane root according to the invention.

FIG. 3 is a schematic partial cross-sectional view of the root of a fan vane according to the first step of the method according to the invention.

FIG. 4 is a schematic partial cross-sectional view of the root of a fan vane according to the third step of the method according to the invention.

Unless otherwise specified, a same element appearing in different figures has a single reference.

DETAILED DESCRIPTION

FIG. 1 represents a partial cross-sectional view of a fan vane 12, the root 121 of which is housed in a root support, and more particularly a cell 101 of a rotor disc 10, the vane being subjected to centrifugal forces.

The invention will be mainly described by taking as an example mounting of a fan vane in a root support formed by a fan rotor disc.

However, the present invention is not limited to mounting of fan vanes in a fan rotor disc. Indeed, the invention is also applicable to other types of mounting of turbomachine movable vanes. Thus, the invention is applicable to any composite piece where flatness is important, in particular all composite parts interfacing with a metal piece for which grinding is necessary.

These composite pieces are formed from a woven preform which is injected with a resin. This preform can be a 2D or 3D preform. The fan vane is manufactured from a 3D woven preform.

Complementarily, the present invention applies to fixed vanes and supports associated therewith, such as casings or flanges supporting fixed vanes.

Conventionally, a fan movable vane 12 is formed by two assemblies: a lower part called the root 121, and an upper part formed by the blade (not represented).

The fan movable vane 12 extends along a longitudinal axis Z. It should be noted that the longitudinal axis Z of the fan movable vane 12 is perpendicular to the axis of rotation of the fan.

Each cell 101 of the rotor disc 10 has a shape substantially complementary to the shape of the root 121 of the vane 12 to form a dovetail-type mounting.

The cells 101 are radially equidistantly distributed along the circumference of the rotor disc 10, and the opening of the cell is directed outwardly.

As can be seen in [FIG. 1] showing an enlarged portion of the transverse cross-section of the rotor disc 10, i.e. a cross-section orthogonal to the axis of rotation of the fan, each root 121 of a vane 12 has a symmetrical contour with two side walls 122, forming the flanks of the root 121, diverging from one another from the body of the vane 12 towards the free end of the root 121 of the vane 12, to a bottom wall 124 substantially parallel to the axis of rotation of the fan and to the periphery of the rotor disc 10, and orthogonal to the main longitudinal direction Z of the corresponding vane 12.

The cells 101 have a similar shape with side walls 102 outwardly tilted from the circumference towards the internal portion of the rotor disc 10 to a bottom wall 104.

The dimensions of the root 121 of the vane 12 and of the cell 101 are such that when the rotor disc 10 is at rest, the root 121 is retained in the cell 101, the bottom wall 124 of the root 121 then being able to touch the bottom wall 104 of the cell 101. To avoid too great a degree of freedom in the radial movement of the blade, a shim may be present.

When the rotor disc 10 is operational during operation of the turbomachine, rotation of the rotor disc 10 about the central axis causes the vanes 12 to move radially outwardly as a result of centrifugal forces, i.e. in the direction of the arrow 13 in [FIG. 1], substantially parallel to the longitudinal axis Z of the vane 12. At this point, the side walls 122 of the root 121 of the vane 12 bear against the side walls 102 of the cell 101, which ensures that the vane 12 is retained inside the cell 101, i.e. is connected to the rotor disc 10.

Each time the speed of rotation of the rotor disc 10 is modified, the sliding movement of the root 121 of the vane 12 combined with the contact pressure of the root 121 and the coefficient of friction between the materials of the vane 12 and the disc 10, generate shearing forces on both the rotor disc 10 and the vane 12, one moving radially with respect to the other by 1 to a few millimetres.

In particular, as is apparent from [FIG. 1], there is in operation an interface zone called a "seat" subject to high forces, designated under the reference sign 14, between the side wall 122 of the root 121 and the side wall 102 of the cell 101, as well as a non-contact region indicated under the reference sign 16, which is not subject to any mechanical contact stress during rotation of the rotor disc 10.

In accordance with the invention, the fatigue and wear damage that occurs on the contacting surfaces of the side walls 102 and 122 as a result of the relative movement between the root 121 of the vane 12 and the cell 101 of the rotor 10 is reduced by the use of a ground anti-wear layer 200 positioned at the seats 14 between the side wall 122 of the root 121 and the side wall 102 of the cell 101.

More precisely, the anti-wear layer 200 is comprised of synthetic fibres. For example, the anti-wear layer 200 is comprised of at least one woven fabric of synthetic fibres.

By way of example, the anti-wear layer 200 is comprised of at least one woven fabric made from glass fibres and/or aramid fibres.

This anti-wear layer 200 adheres to the external surface of the root 121 with an adhesive agent coating or impregnating the synthetic fibres of the layer 200, at least on the face of the layer 200 that is to adhere.

The adhesive agent is, for example, a thermo-polymerisable synthetic adhesive.

The adhesive agent is for example a resin and advantageously a phenolic or polyurethane resin.

As is visible in [FIG. 3], the anti-wear layer 200 has a first external face 210*a* and a second internal face 220 to be adhered to a side wall 122 of the root 121.

This anti-wear layer 200 has a significant initial thickness $e_i$ greater than 1 millimetre, and advantageously in the order of 2 millimetres. The thickness $e_i$, referred to as the initial thickness, of the anti-wear layer 200 corresponds to its thickness upon manufacturing and upon adhering to the root 121 of the vane 12.

During a first step 310 of the preparation method 300, the main steps of which are illustrated in [FIG. 2], an anti-wear layer 200 is positioned on each side wall of the root 121 at the seats 14, as illustrated in [FIG. 3].

This anti-wear layer 200 adheres to the external surface of the root 121 via the adhesive agent coating or impregnating the synthetic fibres of the layer 200.

According to one alternative embodiment, it is also possible to impregnate the synthetic fibres of the anti-wear layer 200 directly (i.e. the anti-wear layer is not pre-impregnated before being positioned), or complementarily, when the layer is in position on the root 121. In this case, impregnation is carried out at the same time as injection of the vane preform.

A second step 320 consists in polymerising the adhesive agent. In this second step 320, the assembly formed by the root 121 of the vane 12 and the anti-wear layer 200 is pressurised with the adhesive agent until the adhesive agent is polymerised.

The pressure used is in the order of 7 to 14 MPa. This ensures good adhesion of the adhesive over the entire surface as well as discharge of the solvents.

Polymerisation is carried out, for example, at a temperature of between 150° C. and 180° C. for a period of time of 1 hour.

A thick anti-wear layer 200 having thickness $e_i$ is thus obtained, perfectly adhering to the side wall 122 of the root 121.

At this stage of the preparation method, the thickness $e_i$ of the anti-wear layer 200 is greater than the operating and mounting clearance between the root 121 and the cell 101, so that mounting as it stands is not possible.

It may also be noticed that, following this polymerisation step schematically illustrated in [FIG. 3], the surface condition and especially flatness of the external face 210*a* is substantially identical to the surface condition of the side wall 122 of the root 121. At this stage, the surface condition of the anti-wear layer 200 has flatness defects.

After the polymerisation step 320, the root 121 of the vane 12 can be cleaned to remove any excess adhesive agent that underwent creep, by sandblasting, for example with glass beads.

In a third step 330, the external face 210*a* of the anti-wear layer 200 adhered to the root 121 of the vane 12 is machined. Machining makes it possible to decrease thickness of the anti-wear layer 200 and to grind the external face 210*a* so as to obtain a planar ground external face 210*b* as illustrated in FIG. 4. This machining step makes it possible to control final thickness $e_f$ of the anti-wear layer 200 and to improve surface condition as well as flatness tolerances of the external surface 210*b*.

After machining, the anti-wear layer 200 has a final thickness $e_f$ in the order of a few tenths of one millimetre, advantageously in the order of 0.3 millimetre.

Machining the external face 210*a* of the anti-wear layer 200 is carried out using as a reference frame the machining reference frame of the side faces 122 of the root 121 of the vane 12, which makes it possible to control orientation and thickness of the anti-wear layer 200. This ensures better positioning of the root 121 of the vane 12 in the cell 101 of the rotor disc 10, as well as better stress distribution.

Thus, by virtue of such a method for preparing the vane roots prior to mounting, it is possible to very significantly increase life time of the interfaces between the roots 121 of the vane 12 and the cells 101 of the rotor disc 10, especially as a result of a better force distribution over the entire surface of the anti-wear layer 200.

The preparation method 300 previously described can be integrated into a method for manufacturing a turbomachine vane.

The preparation method 300 previously described may also be integrated into a more overall method for mounting a vane 12 in a rotor disc 10 or even a rotor assembly.

The preparation method 300 previously described can also be integrated into a more overall method for repairing an anti-wear member at the junction between the vane root and the cell, regardless of whether initial mounting was carried out in accordance with the invention or with another type of anti-wear member, whether metallic or non-metallic.

The invention claimed is:

1. A method for preparing a root of a vane, the vane being a turbomachine vane made of composite material and to be mounted in a root support, the method comprising:

a first step of positioning on a side wall of the root of the vane an anti-wear layer including synthetic fibres coated or impregnated with an adhesive agent;

a second step of polymerising the adhesive agent so that said anti-wear layer adheres to the side wall of the root of the vane, and after the second step, a third step of machining a free external surface of said anti-wear layer for being in contact with the root support, so as to obtain a ground external surface that forms at least a portion of the external surface of the root of the vane, the third step of machining decreasing a thickness of the anti-wear layer so as to shift from an initial thickness greater than 1 millimetre to a final thickness, the initial thickness of the anti-wear layer corresponding to the thickness of the anti-wear layer during the first step of positioning.

2. The method for preparing the root of the vane according to claim 1, wherein the third step is carried out by taking a machining reference frame of the root of the vane as a machining reference frame of the free external surface of said anti-wear layer.

3. The method for preparing the root of the vane according to claim 1, wherein the anti-wear layer includes at least one woven ply of synthetic fibres.

4. The method for preparing the root of the vane according to claim 1, wherein the anti-wear layer includes at least one woven ply of glass fibres.

5. A method for repairing the root of the turbomachine vane made of composite material, comprising partially or totally removing a damaged anti-wear member and preparing the vane root according to the preparation method according to claim 1.

6. The turbomachine vane made of composite material including the root prepared according to the preparation method according to claim 1, wherein the root includes, at the side wall, the anti-wear layer including the synthetic fibres and the polymerised adhesive agent and having the ground external surface obtained by machining the free external surface of the anti-wear layer.

7. The method for preparing the root of the vane according to claim 1, wherein the second step of polymerizing is performed at a temperature between 150° C. and 200° C. and under a pressure of 7 to 14 MPa for a minimum duration of 1 hour.

8. The method for preparing the root of the vane according to claim 1, wherein the anti-wear layer comprises at least one woven ply of synthetic fibers selected from the group consisting of glass fibers, aramid fibers, and a combination thereof.

9. The method for preparing the root of the vane according to claim 1, wherein the anti-wear layer is pre-impregnated with the adhesive agent before positioning on the vane root, and excess adhesive is removed after polymerization by a non-abrasive cleaning technique.

* * * * *